United States Patent
Zhao et al.

(10) Patent No.: US 11,958,542 B2
(45) Date of Patent: Apr. 16, 2024

(54) CLUTCH MECHANISM, STEERING SYSTEM, AND AUTOMOBILE

(71) Applicant: BYD COMPANY LIMITED, Guangdong (CN)

(72) Inventors: Min Zhao, Shenzhen (CN); Chong Sun, Shenzhen (CN); Guanjia Xiao, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 102 days.

(21) Appl. No.: 17/771,805

(22) PCT Filed: Sep. 23, 2020

(86) PCT No.: PCT/CN2020/117122
§ 371 (c)(1),
(2) Date: Apr. 25, 2022

(87) PCT Pub. No.: WO2021/077970
PCT Pub. Date: Apr. 29, 2021

(65) Prior Publication Data
US 2022/0396306 A1    Dec. 15, 2022

(30) Foreign Application Priority Data
Oct. 25, 2019    (CN) .......................... 201911023715.8

(51) Int. Cl.
*B62D 5/00* (2006.01)
*B62D 6/00* (2006.01)
*B62D 15/02* (2006.01)

(52) U.S. Cl.
CPC ............. *B62D 5/006* (2013.01); *B62D 6/008* (2013.01); *B62D 15/0215* (2013.01)

(58) Field of Classification Search
CPC ...... B62D 5/003; B62D 1/286; B62D 5/0478; B62D 5/006
See application file for complete search history.

(56) References Cited

U.S. PATENT DOCUMENTS 5,835,870 A * 11/1998 Kagawa ................... B62D 1/28
701/41
9,481,393 B1 * 11/2016 Meyerhoffer ............ B62D 6/00
(Continued)

FOREIGN PATENT DOCUMENTS

CN    1336498 A    2/2002
CN    202138407 U    2/2012
(Continued)

OTHER PUBLICATIONS

English Translation of International Search Report from PCT/CN2020/117122 dated Dec. 30, 2020 (2 pages).

*Primary Examiner* — Randell J Krug
(74) *Attorney, Agent, or Firm* — Calfee, Halter & Griswold LLP

(57) ABSTRACT

Disclosed are a clutch mechanism, a steering system, and an automobile. The clutch mechanism includes a slidable block and a driving component. The slidable block can be accommodated in a radial spacing between a first end shaft and a second end shaft that are coaxially arranged and radially spaced apart from each other, and is configured to translate along an axial direction of the first end shaft and the second end shaft to realize decoupling or coupling between the first end shaft and the second end shaft. The driving component is configured to drive the slidable block to translate along the axial direction of the first end shaft and the second end shaft.

18 Claims, 6 Drawing Sheets

(56) References Cited

U.S. PATENT DOCUMENTS

| | | | | |
|---|---|---|---|---|
| 11,192,575 | B2 * | 12/2021 | Forte | .................... B62D 5/0409 |
| 2016/0009312 | A1 * | 1/2016 | Pfeiffer | .................. B62D 5/006 |
| | | | | 74/395 |
| 2017/0217475 | A1 | 8/2017 | Shiina | |
| 2019/0276070 | A1 | 9/2019 | Klinger | |

FOREIGN PATENT DOCUMENTS

| | | | | |
|---|---|---|---|---|
| CN | 103978836 | A | 8/2014 | |
| CN | 104214241 | A | 12/2014 | |
| CN | 205706842 | A | 11/2016 | |
| CN | 106256654 | A | 12/2016 | |
| CN | 106515843 | A | 3/2017 | |
| CN | 106627740 | A | 5/2017 | |
| CN | 107110232 | A | 8/2017 | |
| CN | 107444480 | A | 12/2017 | |
| CN | 110001771 | A | 7/2019 | |
| CN | 110234897 | A | 9/2019 | |
| CN | 110316239 | A | 10/2019 | |
| CN | 201923201 | U | 10/2019 | |
| DE | 20213472 | U1 | 1/2003 | |
| DE | 102015103921 | A1 | 9/2016 | |
| EP | 1481873 | A1 | 12/2004 | |
| EP | 2330012 | A1 | 6/2011 | |
| EP | 3536580 | A1 * | 9/2019 | ............ B60W 50/16 |
| IN | 110217236 | A | 9/2019 | |
| JP | 11973051932 | U | 7/1973 | |
| JP | 03163224 | A | 7/1991 | |
| JP | 2004351975 | A | 12/2004 | |
| JP | 4089374 | B2 | 5/2008 | |
| JP | 2011116214 | A | 6/2011 | |
| JP | 2012172790 | A | 9/2012 | |
| JP | 2018140661 | A | 9/2018 | |

* cited by examiner

CLUTCH MECHANISM, STEERING SYSTEM, AND AUTOMOBILE

CROSS-REFERENCE TO RELATED APPLICATIONS

The present disclosure is the National Stage of PCT International Application No. PCT/CN2020/117122, filed on Sep. 23, 2020, which claims priority to Chinese Patent Application No, 201911023715.8, filed on Oct. 25, 2019 and entitled "CLUTCH MECHANISM, STEERING SYSTEM, AND AUTOMOBILE".

FIELD

The present disclosure relates to the field of automobiles, and specifically, to a clutch mechanism, a steering system, and an automobile.

BACKGROUND

With the advancement of science and technology, people have increasingly high requirements for functions of automobile game entertainment. Racing games such as Need For Speed and QQ Speed bring people experience of crazy driving fun, and therefore have numerous fans. Currently, the above game functions are generally experienced by operating a conventional keyboard or operating a dedicated game steering wheel on a PC side. The conventional keyboard cannot realistically simulate the handfeel of manipulating a steering wheel to turn during driving, and the dedicated game steering wheel is bulky and not cost-effective for a user to purchase for use. If the user goes to a relevant entertainment place to operate the dedicated game steering wheel, use requirements of the user cannot be satisfied anytime anywhere as a result of a limited place.

Sitting on a seat in an automobile to directly experience the above games by using a steering wheel of the automobile is a desirable solution. The inventor of the present disclosure found in practice that steering systems, steering wheels, and steering device end shafts of all automobiles currently existing on the market are in a meshed state for a long time. Even if the steering wheel is adjusted in four directions such as upward, downward, forward, and backward directions, a structure (such as splines) for transmitting torque is not disengaged. As a result, turning the steering wheel inevitably drives tires to axially move, resulting in repeated static friction between the tires and the ground. Consequently, the tires are seriously worn, and cannot be accepted by consumers.

SUMMARY

One of objectives of the present disclosure is to provide a clutch mechanism to resolve the above problems in related arts. The clutch mechanism can realize decoupling or coupling of a steering system, thereby facilitating implementation of solutions in an automobile game scenario.

In order to achieve the above objective, a first aspect of the present disclosure provides a clutch mechanism. The clutch mechanism includes:
  a slidable block, accommodated in a radial spacing between a first end shaft and a second end shaft that are coaxially arranged and radially spaced apart from each other and configured to translate along an axial direction of the first end shaft and the second end shaft to realize decoupling or coupling between the first end shaft and the second end shaft; and
  a driving component, configured to drive the slidable block to translate along the axial direction of the first end shaft and the second end shaft.

Optionally, the first end shaft is a steering wheel end shaft, and the second end shaft is a steering device end shaft, and/or one of the first end shaft and the second end shaft is a hollow structure, a part of the other of the first end shaft and the second end shaft in the axial direction extends into the hollow structure; and an outer circumferential surface of the part is radially spaced apart from an inner circumferential surface of the hollow structure to accommodate the slidable block.

Optionally, the part of the other of the first end shaft and the second end shaft in the axial direction has a first axial section and a second axial section. A radial spacing between an outer circumferential surface of the first axial section and the inner circumferential surface of the hollow structure is less than a radial spacing between an outer circumferential surface of the second axial section and the inner circumferential surface of the hollow structure. At a coupling position, an outer sidewall of the slidable block is engaged with the inner circumferential surface of the hollow structure and an inner sidewall of the slidable block is engaged with the outer circumferential surface of the first axial section.

Optionally, the slidable block is normally splined with the hollow structure, and is splined with the first axial section at the coupling position.

Optionally, the slidable block is a sleeve. The sleeve is arranged coaxially with the first end shaft and the second end shaft.

Optionally, the driving component is located on an outer side of the hollow structure. An opening is formed on a sidewall of the hollow structure to cause the driving component to be connected with the slidable block.

Optionally, a bearing is coaxially disposed on the outer side of the hollow structure. The slidable block is fixedly connected with an inner rim of the bearing. An outer rim of the bearing is connected with the driving component.

Optionally, a mounting member is formed on the outer sidewall of the slidable block. The mounting member extends out of the hollow structure through the opening on the sidewall of the hollow structure to be connected with the driving component. A limiting structure respectively abutting against two end surfaces of the inner rim of the bearing is disposed on the mounting member.

Optionally, the bearing is mounted in a bearing mounting ring. A connecting portion configured to be connected with the driving component is formed on an outer circumferential surface of the bearing mounting ring. A radial step configured to abut against a lower end surface of the outer rim of the bearing is formed on an inner circumferential surface of the bearing mounting ring along a circumferential direction.

Optionally, the driving component is an electric driving component.

The electric driving component includes:
  a power element, configured to provide a driving force;
  a screw rod, connected with an output shaft of the power element for synchronous rotation; and
  a helical transmission mechanism, threadedly connected with the screw rod, connected with the slidable block, and configured to convert rotation of the screw rod to axial translation of the slidable block.

The clutch mechanism includes a clutch mechanism housing. The hollow structure is axially rotatably mounted in the clutch mechanism housing. The driving component is mounted to an outer side of the clutch mechanism housing and fixed to the clutch mechanism housing.

Optionally, multiple arcuate plates spaced apart from each other along a circumferential direction are formed on a lower portion of the hollow structure. The part of the other of first end shaft and the second end shaft in the axial direction extends into a circular space defined by the plurality of arcuate plates. The clutch mechanism further includes a base. Arcuate holes corresponding to structures of the arcuate plates are formed on the base. Bottom ends of the plurality of arcuate plates are inserted into the base through the arcuate holes and are fixed to the base. A first bearing is coaxially mounted in a radial spacing between the base and the clutch mechanism housing. A second bearing is coaxially mounted in a radial spacing between an upper portion of the hollow structure and the clutch mechanism housing.

Optionally, connecting portions radially protruding outward are disposed at opposite positions on two axial sides of the clutch mechanism housing; a power element housing of the power element is fixedly mounted to the connecting portion on one of the axial sides of the clutch mechanism housing; the screw rod is axially rotatably mounted to the connecting portion on the other of the axial sides of the clutch mechanism housing; and/or an adapter configured to fix the clutch mechanism housing to a vehicle body is further disposed on the clutch mechanism housing.

Based on the clutch mechanism provided in the first aspect of the present disclosure, a second aspect of the present disclosure provides a steering system. The steering system includes a first end shaft, a second end shaft, and a clutch mechanism configured to realize decoupling or coupling between the first end shaft and the second end shaft. The clutch mechanism is the clutch mechanism in the first aspect of the present disclosure.

Optionally, the steering system further includes a torque feedback mechanism. The torque feedback mechanism is configured to apply a reverse feedback torque to the first end shaft according to a torsional torque of the first end shaft in a decoupled state, to enhance an operation feeling of a steering wheel connected with the first end shaft in a transmission way.

Optionally, the torque feedback mechanism includes:
a torque detection element, configured to detect the torsional torque of the first end shaft in the decoupled state;
a power element, configured to provide a driving force;
a transmission mechanism, configured to transmit the driving force to the first end shaft to apply the reverse feedback torque to the first end shaft; and
a controller, configured to control, according to the torsional torque detected by the torque detection element, the power element to provide the driving force.

Optionally, the steering system further includes a reset mechanism. The reset mechanism is configured to drive the first end shaft to be reset after completion of the decoupling, to enable the clutch mechanism to couple the first end shaft and the second end shaft.

Optionally, the reset mechanism includes:
an angle detection element, configured to detect a steering angle of the first end shaft before the decoupling and a steering angle of the first end shaft after completion of the decoupling;
a power element, configured to provide a driving force;

a transmission mechanism, configured to transmit the driving force to the first end shaft to drive the first end shaft to be reset to the steering angle before the decoupling; and
a controller, configured to control, according to the steering angle detected by the angle detection element, the power element to provide the driving force.

Optionally, the power element is a motor. The transmission mechanism includes a first gear connected with an output shaft of the motor for synchronous rotation and a second gear connected with the first end shaft for synchronous rotation. The first gear is meshed with the second gear. An external diameter of the first gear is less than an external diameter of the second gear.

Optionally, the second gear is coaxially fixed to the first end shaft. A retaining structure respectively abutting against two axial end surfaces of the second gear is disposed on an outer sidewall of the first end shaft. A protrusion is formed on the outer sidewall of the first end shaft. A notch is formed on an edge portion of an inner rim of the second gear corresponding to the protrusion. The protrusion is accommodated in the notch.

Optionally, a limiting mechanism configured to limit a range of steering angle of the first end shaft in the decoupled state is further disposed in the steering system.

Optionally, the first end shaft is a hollow structure. A part of the second end shaft in an axial direction extends into the hollow structure. The limiting mechanism includes a limiting nut threadedly connected with an end of the second end shaft located in the hollow structure; external splines mated with splines on an inner circumferential surface of the hollow structure are formed on an outer circumferential surface of the limiting nut. Limiting portions configured to limit displacements of two axial sides of the limiting nut are further disposed on the inner circumferential surface of the hollow structure and/or an outer circumferential surface of the second end shaft.

Optionally, the second end shaft includes a steering sleeve and a steering shaft that are disposed coaxially. The steering shaft extends into the steering sleeve and is connected with the steering sleeve for synchronous rotation. The steering sleeve is located in the hollow structure. External threads configured to be threadedly connected with the limiting nut and external splines configured to be splined with the slidable block to couple the first end shaft to the second end shaft are machined on an outer circumferential surface of the steering sleeve.

Optionally, the steering sleeve is supported in the first end shaft by using a sleeve bearing. A limiting structure respectively configured to abut against two end surfaces of an inner rim of the sleeve bearing is formed on an outer circumferential surface of the steering sleeve. An outer rim of the sleeve bearing is fixedly connected with the first end shaft.

Optionally, the first end shaft is a steering wheel end shaft, and the second end shaft is a steering device end shaft.

Based on the steering system provided in the second aspect of the present disclosure, a third aspect of the present disclosure provides an automobile. The automobile includes the steering system in the second aspect of the present disclosure.

The technical solutions of the present disclosure have the following beneficial effects.

According to the present disclosure, the first end shaft and the second end shaft are coaxially arranged and radially spaced apart from each other, the clutch mechanism includes the slidable block and the driving component, and the slidable block is accommodated in the radial spacing between the first end shaft and the second end shaft, and is configured to be driven by the driving component to move along the axial direction of the first end shaft and the second end shaft to realize decoupling or coupling between the first end shaft and the second end shaft. The clutch mechanism is applicable to the steering system of the automobile. In this case, the first end shaft may be used as the steering wheel end shaft, and the second end shaft may be used as the steering device end shaft. When the first end shaft and the second end shaft are coupled, the automobile enters a normal driving mode, and tires are driven to turn when a user operates a steering wheel. When the first end shaft and the second end shaft are decoupled, the automobile enters a game mode, and the tires are not driven to turn when the user operates the steering wheel. In this way, tire wear caused by repeated static friction between the tires and the ground after the automobile enters the game mode can be prevented, thereby facilitating implementation of solutions in an automobile game scenario.

1—Steering wheel end shaft; 2—Second gear; 3—Limiting ring; 4—Second bearing; 5—Second limiting ring; 6—Limiting nut; 7—Shaft pin; 11—Limiting ring; 12—Bearing; 13—Bearing mounting, ring; 14—Slidable block; 15—Connecting portion; 16—Radial Step; 17—Mounting member; 21—First gear; 22—Intermediate adapter bracket; 23—Motor; 30—Driving component; 31—Motor; 32—Intermediate adapter bracket; 33—Screw rod; 34—Helical transmission mechanism; 41—Clutch mechanism housing; 42—Adapter; 43—Bearing; 51—Limiting ring; 52—Sleeve bearing; 53—Steering sleeve; 54—First axial section; 55—Second axial section; 61—Base; 62—First bearing; 63—First limiting, ring; 64—First limiting surface; 70—Steering shaft; 100—Clutch mechanism; 200—Steering column mounting housing.

DETAILED DESCRIPTION

Specific implementations of the present disclosure are described in detail below with reference to the accompanying drawings. It should be understood that the specific implementations described herein are merely used to describe and explain the present disclosure, and are not used to limit the present disclosure.

In the present disclosure, unless otherwise stated, directional terms such as "up", "down", "left", and "right" are generally up, down, left, and right with reference to the drawings. "Inside/inner side" and "outside/outer side" mean inside and outside relative to a contour of a component.

An automobile steering system is configured to achieve driving connection between a steering wheel and wheels. When a user rotates the steering wheel, the wheels can be driven to deflect by using the automobile steering system, thereby controlling a traveling direction of an automobile.

Figure 1:
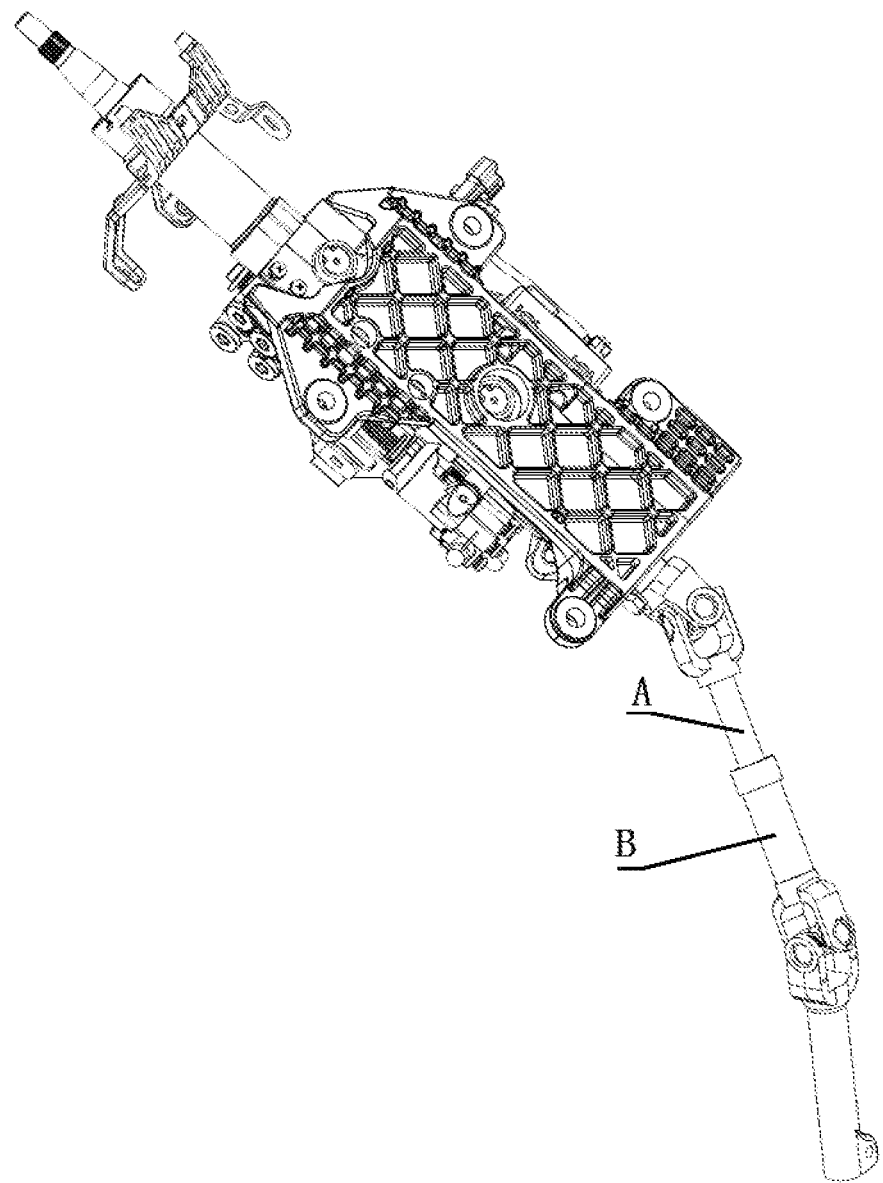
FIG. 1 is a conventional automobile steering system.
Figure 2:
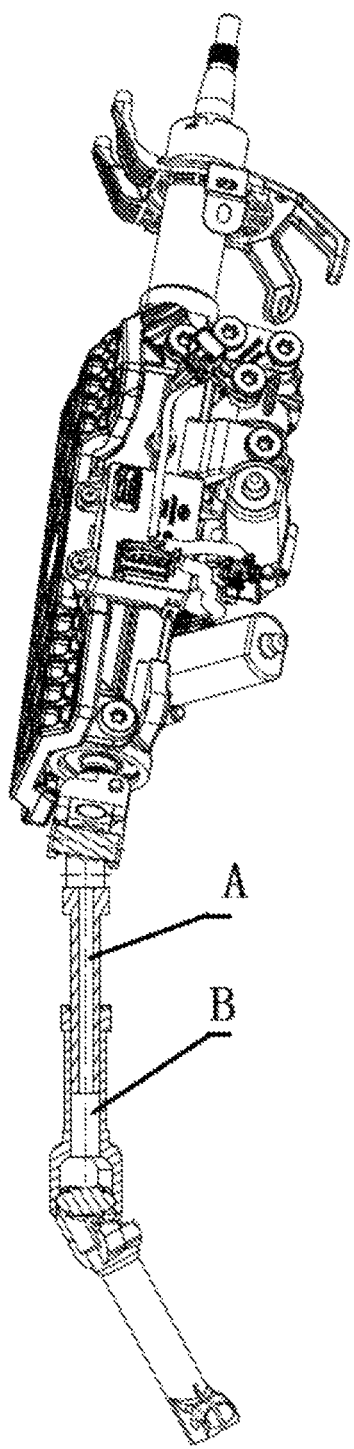
FIG. 2 is a schematic structural diagram of the conventional automobile steering system having a partial cross-sectional structure.

FIG. 1 to FIG. 2 are schematic structural diagrams of an automobile steering system in related arts. The automobile steering system includes a steering wheel end shaft A and a steering device end shaft B. The steering wheel end shaft A is a rotary shaft connected with the steering wheel in a transmission way. The steering device end shaft B is a rotary shaft connected with the wheels in a transmission way. The steering wheel end shaft A is fixedly connected with the steering device end shaft B, and cannot be decoupled. In a game mode, when the user rotates the steering wheel, the wheels are driven to deflect, resulting, in serious wear of the tires.

Referring to FIG. 3 to FIG. 6, in order to resolve the technical problem, a first aspect of embodiments of the present disclosure provides a clutch mechanism 100. The clutch mechanism 100 is mounted between a steering wheel end shaft 1 and a steering device end shaft, and is configured to realize decoupling or coupling between the steering wheel end shaft 1 and the steering device end shaft. In order to realize decoupling or coupling between the steering wheel end shaft 1 and the steering device end shaft, structures of the conventional steering wheel end shaft A and the conventional steering device end shaft B require improvements. In an embodiment of the present disclosure, the steering wheel end shaft 1 and the steering device end shaft are coaxially arranged and radially spaced apart from each other. The clutch mechanism 100 includes a slidable block 14 and a driving component 30. The slidable block 14 is accommodated in a radial spacing between the steering wheel end shaft 1 and the steering device end shaft, and is configured to be driven by the driving component 30 to move along the axial direction of the steering wheel end shaft 1 and the steering device end shaft, thereby realizing decoupling or coupling between the steering wheel end shaft 1 and the steering device end shaft. When the steering wheel end shaft 1 and the steering device end shaft are coupled, an automobile enters a normal driving mode, and the wheels are driven to turn when a user rotates a steering wheel. When the steering wheel end shaft 1 and the steering device end shaft are decoupled, the automobile enters a game mode, and the wheels are not driven to turn when the user rotates the steering wheel. In this way, tire wear caused by repeated static friction between the tires and the ground after the automobile enters the game mode can be prevented, thereby facilitating implementation of solutions in an automobile game scenario.

It is to be noted that, the clutch mechanism provided in this embodiment of the present disclosure is further applicable to other occasions that require decoupling or coupling, and is not limited to the steering system of the automobile. That is to say, the clutch mechanism may be configured to decouple or couple any first end shaft and second end shaft that require decoupling or coupling. In the following embodiments of the present disclosure, specific structures and working principles of the clutch mechanism and the steering system are described by using the first end shaft being the steering wheel end shaft and the second end shaft being the steering device end shaft as an example.

Specifically, one of the steering wheel end shaft 1 and the steering device end shaft is a hollow structure. A part of the other of the steering wheel end shaft and the steering device end shaft in the axial direction extends into the hollow structure. An outer circumferential surface of the axial part and an inner circumferential surface of the hollow structure are radially spaced apart from each other to accommodate the slidable block 14. The part of the other of the steering wheel end shaft and the steering device end shaft in the axial direction has a first axial section 54 and a second axial section 55. A radial spacing between an outer circumferential surface of the first axial section 54 and the inner circumferential surface of the hollow structure is different from a radial spacing between an outer circumferential surface of the second axial section 55 and the inner circumferential surface of the hollow structure.

For example, the radial spacing between the outer circumferential surface of the first axial section 54 and the inner circumferential surface of the hollow structure is less than the radial spacing between the outer circumferential surface of the second axial section 55 and the inner circumferential surface of the hollow structure. When the slidable block 14 is moved to a radial spacing between the first axial section 54 and the hollow structure along the axial direction of the steering wheel end shaft 1 and the steering device end shaft, an inner sidewall of the slidable block 14 is engaged with the outer circumferential surface of the first axial section 54, and an outer sidewall of the slidable block 14 is engaged with the inner circumferential surface of the hollow structure. In this way, the steering wheel end shaft 1 and the steering device end shaft are coupled, and the automobile enters the normal driving mode. When the slidable block 14 is moved to a radial spacing between the second axial section 55 and the hollow structure along the axial direction of the steering wheel end shaft 1 and the steering device end shaft, the slidable block is engaged with only one of the second axial section 55 and the hollow structure and is separated from the other of the second axial section 55 and the hollow structure. In this way, the steering wheel end shaft 1 and the steering device end shaft are decoupled, and the automobile enters the game mode.

The slidable block 14 may be engaged with the hollow structure, the first axial section 54, or the second axial section 55 in many manners, for example, by means of mating between a groove and a protrusion or by spline. In an optional embodiment, the slidable block 14 is splined with the hollow structure, the first axial section 54, or the second axial section 55.

Specifically, for example, a radial dimension of the first axial section 54 is greater than a radial dimension of the second axial section 55. The radial spacing between the hollow structure and the first axial section 54 is less than the radial spacing between the hollow structure and the second axial section 55. When the slidable block 14 is moved to the radial spacing between the first axial section 54 and the hollow structure, the outer sidewall of the slidable block 14 is splined with the inner circumferential surface of the hollow structure, and the inner sidewall of the slidable block 14 is splined with the outer circumferential surface of the first axial section 54. In this case, the steering wheel end shaft 1 and the steering device end shaft are in a coupled state. When the slidable block 14 is moved to the radial spacing between the second axial section 55 and the hollow structure, the inner sidewall of the slidable block 14 is spaced apart from the outer circumferential surface of the second axial section 55, and the inner sidewall of the slidable block and the outer circumferential surface of the second axial section are in a separated state, the outer sidewall of slidable block 14 is splined with the inner circumferential surface of the hollow structure. In this case, the steering wheel end shaft 1 and the steering device end shaft are in the decoupled state, and a rotational torque of the steering wheel is not transmitted to the steering device end shaft. That is to say, the outer sidewall of the slidable block 14 is normally engaged with the inner circumferential surface of the hollow structure by using the splines, and the inner sidewall of the slidable block 14 is splined with the outer circumferential surface of the first axial section 54 only in the coupled state.

In order to implement the above functions, the splines are formed on both the outer sidewall and the inner sidewall of the slidable block 14. The splines are further formed on the inner circumferential surface of the hollow structure and the outer circumferential surface of the first axial section 54. It is to be noted that, the inner sidewall of the slidable block 14 is a sidewall of a side of the slidable block 14 facing the steering device end shaft, and the outer sidewall of the slidable block is a sidewall of a side of the slidable block 14 facing the hollow structure.

A structure of the slidable block 14 may vary. For example, the hollow structure is a hollow cylinder, and the first axial section 54 and the second axial section 55 are both cylinder axes. The slidable block 14 may be a sleeve. The sleeve is arranged coaxially with the steering wheel end shaft 1 and the steering device end shaft. That is to say, the sleeve is sleeved outside the first axial section 54 and the second axial section 55. The splines are formed on an inner circumferential surface and an outer circumferential surface of the sleeve. External splines are formed on the outer circumferential surface of the first axial section 54 corresponding to the splines on the inner circumferential surface of the sleeve. Internal splines are formed on the inner circumferential surface of the hollow cylinder corresponding to the splines on the outer circumferential surface of the sleeve. In this way, during axial translation, the sleeve may be splined with or separated from the first axial section 54 to realize the coupling or the decoupling between the steering wheel end shaft 1 and the steering device end shaft.

The driving component 30 is connected with the slidable block 14, and is configured to drive the slidable block 14 to axially translate. Optionally, the driving component 30 is mounted to an outer side of the hollow structure. In order to realize the connection between the driving component 30 and the slidable block, an opening is formed on the outer sidewall of the hollow structure. A mounting member 17 protruding out of the hollow structure through the opening is formed on the slidable block 14. The mounting member 17 is configured to be connected with the driving component 30.

When the steering wheel end shaft 1 and the steering device end shaft are coupled, the slidable block 14 rotates synchronously with the steering wheel end shaft 1. For example, the driving component 30 is an electric driving component as an example. The driving component 30 is required to be electronically connected with a controller. If the driving component 30 also rotates with the slidable block, a clock spring is usually required to be mounted to prevent an electric wire connected with the driving component 30 from being broken. In this case, mounting, difficulty and costs of the clutch mechanism are both increased.

It is to be noted that, the clock spring is also referred to as a rotary connector, an airbag hairspring, or a spiral cable, which is a spiral harness. The clock spring is constructed as a harness having a specific length, and is in a winding arrangement. During rotation with the steering wheel end shaft 1, the harness can be adaptively loosened reversely or wound more tightly, and is not broken when the steering wheel end shaft 1 is completely turned left or right. The clock spring is a harness frequently used on a vehicle, which is not described in detail herein.

In order to resolve the technical problem, in some embodiments of the present disclosure, a bearing 12 is coaxially disposed on the outer side of the hollow structure. The slidable block 14 is fixedly connected with an inner rim of the bearing 12. An outer rim of the bearing 12 is connected with the driving component 30. In this way, the driving component 30 may drive the bearing 12 to translate along an axial direction of the hollow structure to drive the slidable block 14 to translate along the axial direction of the hollow structure, thereby realizing the coupling or the decoupling between the steering wheel end shaft 1 and the steering device end shaft. In addition, when the slidable block 14 synchronously rotates with the hollow structure, the inner rim of the bearing 12 rotates with the slidable block 14, and the outer rim of the bearing 12 is not affected. Since the driving component 30 is connected with the outer rim of the bearing 12, the driving component 30 is not affected by the rotation of the slidable block 14. That is to say, by means of the bearing 12, the axial rotation of the slidable block 14 is not transferred to the driving component 30. In this way, the driving component 30 can be prevented from being driven by the slidable block 14 to rotate. Therefore, the driving component 30 may be mounted to other relatively stationary components in the automobile, and the clock spring (which may alternatively be referred to as a spiral cable) connected with the driving component 30 is not required to be provided. In this way, the mounting difficulty, design difficulty, and the costs of the clutch mechanism 100 are reduced.

In order to fixedly connect the slidable block 14 with the inner rim of the bearing 12, a mounting member 17 is formed on the outer sidewall of the slidable block 14. The mounting member 17 extends out of the hollow structure through the opening on the sidewall of the hollow structure. A retaining structures respectively abutting against two end surfaces of the inner rim of the bearing 12 is disposed on the mounting member 17. Specifically, a limiting surface abutting against a lower end surface of the inner rim of the bearing is formed on a side of the mounting member 17 facing the inner rim of the bearing. In addition, a groove is further formed on the side of the mounting member 17 facing the inner rim of the bearing. A limiting ring 11 is inserted in the groove. The limiting ring 11 abuts against an upper end surface of the inner rim of the bearing 12. In this way, the inner rim of the bearing 12 can be fixed to the slidable block 14, and axial displacement of the bearing 12 relative to the slidable block 14 can be prevented.

The bearing 12 is connected with the driving component 30. In order to reduce difficulty of the connection between the bearing 12 and the driving component 30, the bearing 12 is mounted in a bearing mounting ring 13, and is connected with the driving component 30 by using the bearing mounting ring 13. Specifically, a connecting portion 15 radially protruding out is formed on an outer circumferential surface of the bearing mounting ring 13. The connecting portion 15 may be provided with a through hole. An engagement member mated with the connecting portion is formed on the driving component 30 corresponding to the connecting portion. A mounting hole is formed on the engagement member. In this way, the bearing and the driving component 30 are fixed together by using a connecting member such as a bolt extending through the through hole and the mounting hole.

The bearing 12 may be assembled in the bearing mounting ring 13 by means of interference fitting. In some optional embodiments, a radial step 16 may be formed on an inner circumferential surface of the bearing mounting ring 13. The radial step 16 abuts against a lower end surface of the outer rim of the bearing 12. In this way, mounting stability of the bearing 12 in the bearing mounting ring 13 can be enhanced.

The driving component 30 may be a manual driving component, or may be an electric driving component. In order to improve an automation level of the clutch mechanism, in some embodiments of the present disclosure, the driving component 30 is the electric driving component. Specifically, the electric driving component includes: a power element, configured to provide a driving force; a screw rod 33, connected with an output shaft of the power element for synchronous rotation; and a helical transmission mechanism 34, threadedly connected with the screw rod 33, connected with the slidable block 14, and configured to convert rotation of the screw rod 33 to axial translation of the slidable block 14.

More specifically, the power element may be a motor 31. The screw rod 33 may be coaxially fixed with an output shaft of the motor 31. For example, a mounting groove is formed on an end of the screw rod 33 close to the output shaft of the motor. The output shaft of the motor 31 is inserted and fixed in the mounting groove. The helical transmission mechanism 34 may be a screw nut. The screw nut is threadedly mounted to the screw rod 33, and is fixedly connected with the slidable block 14. Optionally, the screw nut may be fixedly connected with the connecting portion on the bearing mounting ring 13.

An axial direction of the screw rod 33 is parallel to the axial direction of the steering wheel end shaft 1 and the steering device end shaft. The motor 31 is connected with a controller of the automobile. The controller of the automobile is configured to receive a signal of an electrical component on the automobile, and may transmit a control command to the electrical component, to cause the electrical component to perform a corresponding action. Specifically, the controller can receive a decoupling or coupling signal and control, according to the decoupling or coupling signal, the motor 31 to rotate. When the motor 31 is rotated, the screw rod 33 rotates synchronously with the motor, and drives the screw nut 34 to translate along an axial direction of the screw rod 33. When the screw nut 34 translates axially, the slidable block 14 is driven to axially translate, thereby realizing decoupling or coupling between the steering wheel end shaft 1 and the steering device end shaft.

In order to conveniently mount the driving component 30, in an optional embodiment, the clutch mechanism further includes a clutch mechanism housing 41. The hollow structure is axially rotatably mounted in the clutch mechanism housing 41. The driving component 30 is mounted to an outer side of the clutch mechanism housing 41.

Specifically, the clutch mechanism housing may be a hollow cylinder structure. Connecting portions radially protruding outward are disposed on two axial sides of the clutch mechanism housing 41. A power element housing of the power element is fixedly mounted to the connecting portion on one of the axial sides of the hollow cylinder structure. The screw rod 33 is axially rotatably mounted to the connecting portion on the other of the other axial sides of the hollow cylinder structure.

Figure 4:
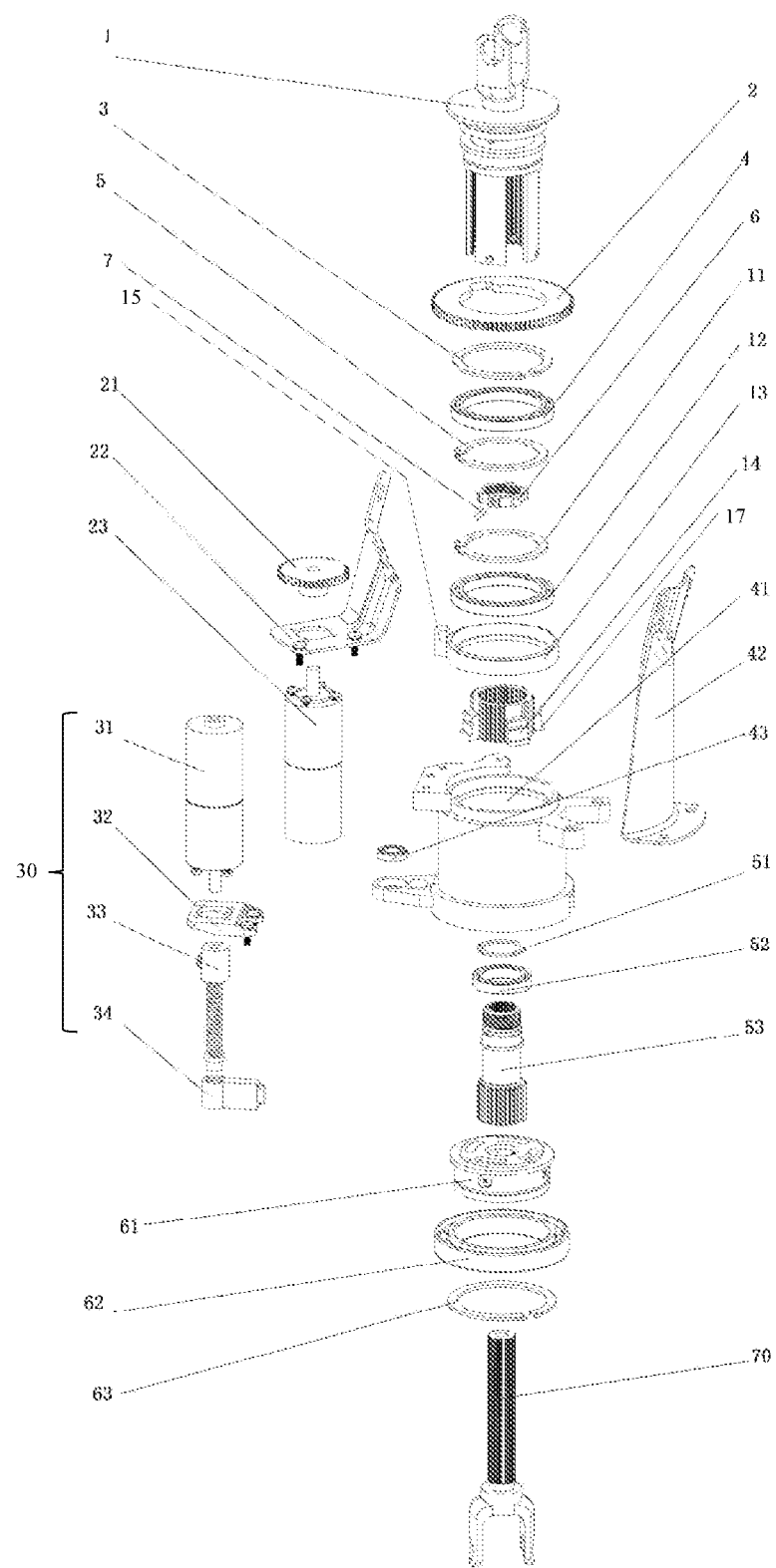
FIG. 4 is an exploded view of a clutch mechanism, a steering wheel end shaft, and a steering device end shaft according to an embodiment of the present disclosure.

Referring to FIG. 4, a first mounting block is disposed on an outer circumferential edge portion on an upper end of the clutch mechanism housing, and a second mounting block is disposed on an outer side of a lower end of the clutch mechanism housing. In some optional embodiments of the present disclosure, the first mounting block and the second mounting block may have different structures, and may be opposite to each other in a vertical direction.

The first mounting block is provided with a first through hole. The power element housing of the power element such as the motor 31 is fixed to the first mounting block by using an intermediate adapter bracket 32. Specifically, referring to FIG. 4, the intermediate adapter bracket 32 may substantially be in a cuboid shape. A relatively large mounting hole is formed in the middle of the intermediate adapter bracket along a thickness direction. An output shaft of the motor 31 extends through the mounting hole and is fixedly connected with an upper end of the screw rod 33. Multiple relatively small positioning holes are further formed around the mounting hole. Connecting members such as screws are caused to extend through the positioning holes to be threadedly connected with the power element housing of the motor 31, thereby fixedly connecting the power element housing of the motor 31 with the intermediate adapter bracket 32. A second through hole is formed on a sidewall of the intermediate adapter bracket 32 corresponding to the first through hole on the first mounting block. The intermediate adapter bracket 32 may be fixedly connected with the first mounting block by using a connecting member such as a bolt extending through the first through hole and the second through hole.

A through hole is formed on the second mounting block. A rotary bearing 43 is fixed in the through hole. A lower end of the screw rod 33 is inserted and fixed in the rotary bearing 43. In this way, when the output shaft of the motor 31 rotates, the screw rod 33 can rotates synchronously with the output shaft, but does not drive the clutch mechanism housing 41 to rotate.

During specific implementation, the clutch mechanism housing 41 is fixed to other stationary components in the automobile, such as a steering column mounting housing 200. In order to facilitate connection between the clutch mechanism housing 41 and the other components, an adapter 42 is further formed on the clutch mechanism housing. The clutch mechanism housing 41 may be connected with the other stationary components by using the adapter 42.

Regardless of whether the automobile is in the normal driving mode or the game mode, the clutch mechanism housing 41 is stationary relative to the automobile. However, the steering wheel end shaft 1 and the steering device end shaft may be in a rotating state. Therefore, the hollow structure is required to be axially rotatably mounted in the clutch mechanism housing 41. In order to implement the function, bearings are respectively disposed on upper and lower sides of a part of the hollow structure extending into the clutch mechanism housing 41, the hollow structure is fixedly connected with inner rims of the bearings, and outer rims of the bearings are fixedly connected with the clutch mechanism housing.

In a specific embodiment, multiple arcuate plates spaced apart from each other along a circumferential direction are formed on a lower portion of the hollow structure. The part of the other of the steering wheel end shaft and the steering device end shaft in the axial direction extends into a circular space defined by the plurality of arcuate plates.

For ease of description, the hollow structure is the steering wheel end shaft 1, and the other of the steering wheel end shaft and the steering device end shaft is the steering device end shaft, for example.

Specifically, the slidable block 14 is accommodated between inner sidewalls of the arcuate plates and the outer circumferential surface of the steering device end shaft. The mounting member on the slidable block 14 protrudes out of the hollow structure through a spacing between the adjacent two arcuate plates, so as to be connected with the driving component 30 on the outer side of the hollow structure.

Internal splines configured to be splined with the slidable block are formed on the inner sidewalls of the arcuate plates. A radial dimension of a lower portion of a part of the steering device end shaft located in the hollow structure is greater than a radial dimension of an upper portion of a part of the steering device end shaft. External splines configured to be splined with the slidable block are formed on an outer circumferential surface of the lower portion.

Bottom ends of the plurality of arcuate plates are inserted into and fixed to a base 61. A first bearing 62 is coaxially mounted in a radial spacing between the base 61 and the clutch mechanism housing 41. A second bearing 4 is coaxially mounted in a radial spacing between the upper portion of the hollow structure and the clutch mechanism housing 41. Specifically, the base 61 may be, for example, a cylindrical structure. Arcuate holes are formed on an upper end plate of the cylindrical structure corresponding to the arcuate plates. The arcuate plates may be inserted into the base 61 through the arcuate holes. Through holes are further formed on lower ends of the arcuate plates. Mounting holes corresponding to the through holes are formed on a sidewall of the cylindrical structure. After the arcuate plates are inserted into the cylindrical structure, the arcuate plates may be attached to an inner sidewall of the cylindrical structure. In this case, the through holes on the arcuate plates are brought into communication with the mounting holes on the sidewall of the cylindrical structure. Therefore, the arcuate plates may be fixed with the base by using, for example, screws.

The first bearing 62 is mounted to an outer circumferential surface of the base 61. Specifically, the first bearing 62 may be, for example, assembled on the outer circumferential surface of the base 61 by means of interference fitting. Further, in order to improve mounting stability of the first bearing 62, a first limiting structure respectively abutting against two end surfaces of an inner rim of the first bearing 62 may be formed on the outer circumferential surface of the base 61.

Figure 5:
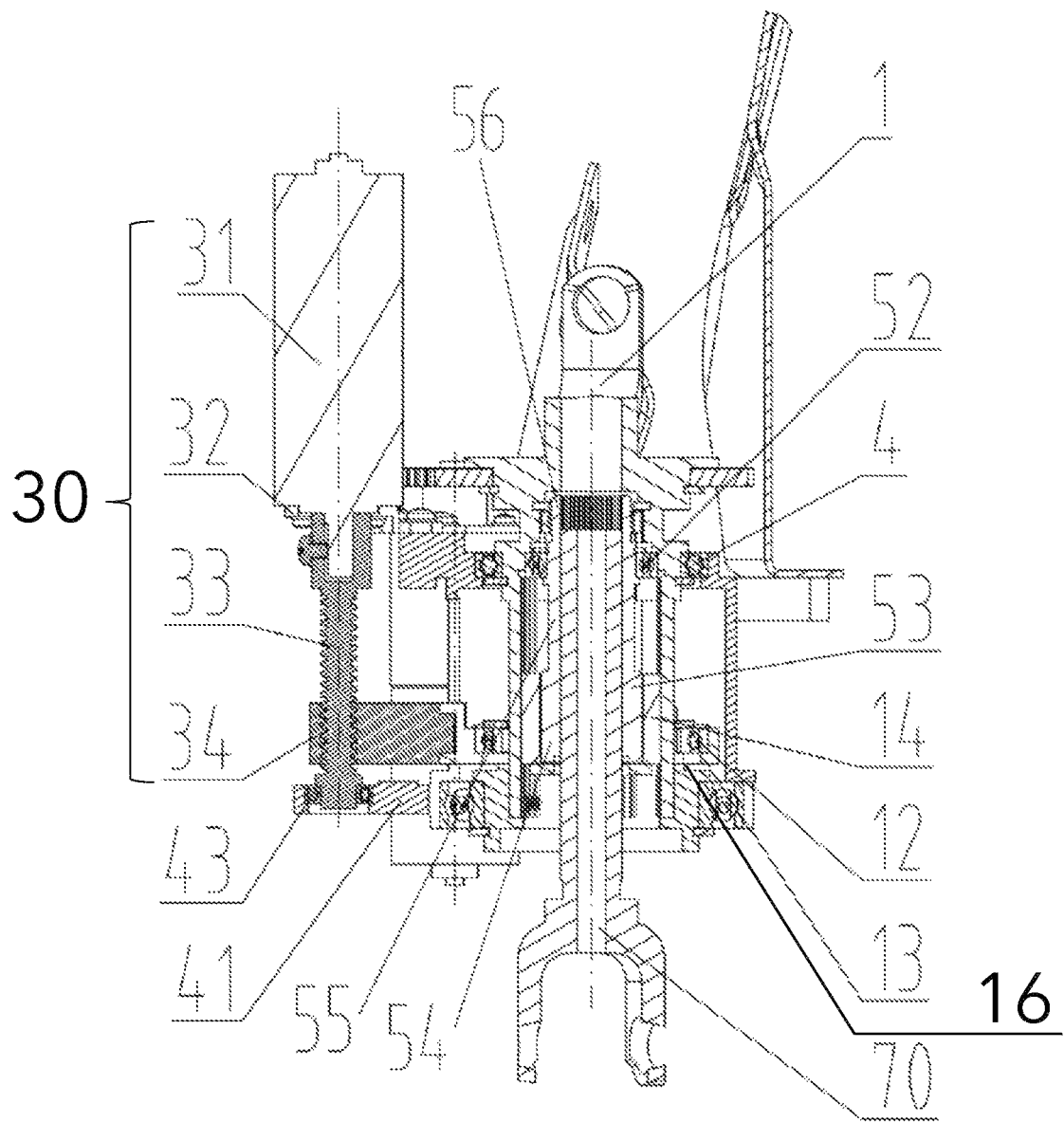
FIG. 5 is a longitudinal cross-sectional view of a steering system according to an embodiment of the present disclosure.
Figure 6:
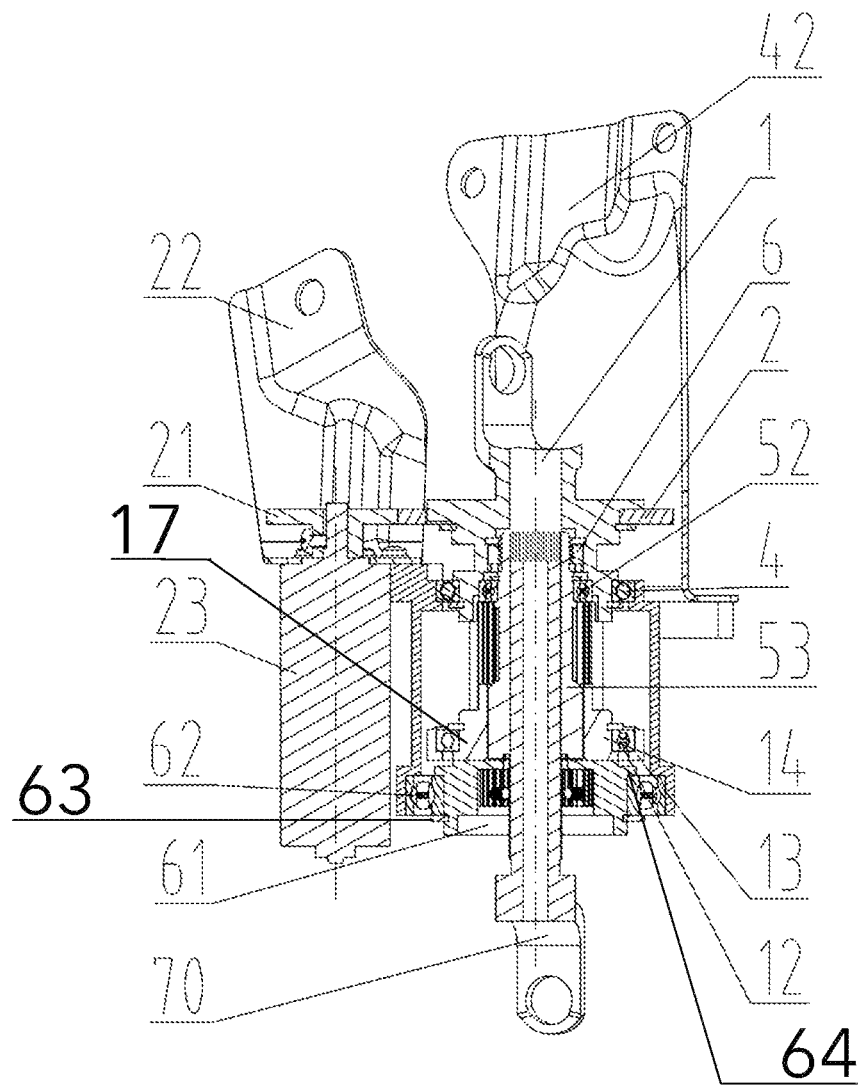
FIG. 6 is another longitudinal cross-sectional view of the steering system according to an embodiment of the present disclosure.

As shown in FIG. 5 to FIG. 6, specifically, the first limiting structure includes a first limiting surface 64 formed on the outer circumferential surface of the base 61. The first limiting surface 64 is configured to abut against an upper end surface of the inner rim of the first bearing 62. Further, the first limiting structure includes a first limiting ring 63 mounted to an outer sidewall of the base 61. The first limiting ring 63 abuts against a lower end surface of the inner rim of the first bearing 62.

In order to mount the first limiting ring 63, a groove is formed on the outer circumferential surface of the base 61 along a circumferential direction. The first limiting ring 63 may be mounted in the groove.

Likewise, in order to stably mount the second bearing 4 on the upper portion of the hollow structure, a second limiting structure respectively abutting against two end surfaces of an inner rim of the second bearing 4 may be formed on the outer circumferential surface of the upper portion of the hollow structure. Specifically, the second limiting structure includes a second limiting surface formed on the outer circumferential surface of the hollow structure. The second limiting surface is configured to abut against an upper end surface of the inner rim of the second bearing 4. Further, the second limiting structure includes a second limiting ring 5 mounted to the outer sidewall of the hollow structure. The second limiting ring 5 abuts against a lower end surface of the inner rim of the second bearing 4.

In order to mount the second limiting ring 5, a groove is formed on the outer circumferential surface of the hollow structure along the circumferential direction. The second limiting ring 5 may be mounted in the groove.

The outer rims of the first bearing 62 and the second bearing 4 are both fixedly connected with the clutch mechanism housing 41.

Based on the clutch mechanism provided in the first aspect of the embodiments of the present disclosure, a second aspect of the embodiments of the present disclosure provides a steering system. The steering system includes a steering wheel end shaft 1, a steering device end shaft, and a clutch mechanism 100 configured to realize decoupling or coupling between the steering wheel end shaft 1 and the steering device end shaft. The clutch mechanism 100 is the clutch mechanism in the first aspect of the embodiments of the present disclosure.

After the steering wheel end shaft 1 and the steering device end shaft are decoupled by means of the above clutch mechanism, an automobile enters a game mode. In the game mode, the user is not subjected to resistance when operating the steering wheel, which affects the operation feeling of the steering wheel and degrades entertainment experience of the user.

In order to resolve the technical problem, the embodiments of the present disclosure further improve the steering system. Specifically, the steering system further includes a torque feedback mechanism. The torque feedback mechanism is configured to apply a reverse feedback torque to the steering wheel end shaft 1 according to a torsional torque of the steering wheel end shaft 1 in a decoupled state, to prevent the steering wheel end shaft 1 from rotating, thereby enhancing the operation feeling of the steering wheel.

The reverse feedback torque is applied to the steering wheel by using the torque feedback mechanism according to the torsional torque. In this way, when the user operates the steering wheel to turn, a specific resistance is applied to the steering wheel, and a user has a "heavy" feeling when operating the steering wheel to turn in the game mode, which is equivalent to driving on a real road, thereby improving the operation experience of the user when using the automobile for game entertainment.

A correspondence between the feedback torque and a detected torsional torque is established by using an experiment and is prestored in a controller. The controller controls, according to the detected torsional torque, a magnitude of the feedback torque outputted by the torque feedback mechanism. In this way, optimal game experience can be provided for the user.

A structure of the torque feedback mechanism may vary. In an optional embodiment, the torque feedback mechanism includes: a torque detection element, configured to detect the torsional torque of the steering wheel end shaft 1 in the decoupled state; a power element, configured to provide a driving force; a transmission mechanism, configured to transmit the driving force to the steering wheel end shaft 1 to apply the reverse feedback torque to the steering wheel end shaft 1; and a controller, configured to control, according to the torsional torque detected by the torque detection element, the power element to provide the driving force.

Specifically, the torque detection element may be, for example, a torque sensor. The power element may be, for example, a motor 23. The controller may be, for example, a single-chip microcomputer, a programmable logic controller, or the like. The controller may control an input current of the motor according to the magnitude of the detected torsional torque, thereby changing a driving force outputted by the motor 23.

The above motor 23 applies the reverse feedback torque to the steering wheel end shaft 1 by operating in a motor mode. Optionally, the motor 23 may alternatively be controlled in the generator mode to apply the reverse feedback torque to the steering wheel end shaft 1. Specifically, when the user rotates the steering wheel, the steering wheel end shaft 1 is driven to rotate, and is connected with a rotor of the motor 23 in a transmission way. In this way, the rotor of the motor 23 is driven to rotate, thereby causing the motor 23 to be in the generator mode.

The driving force is transmitted to the steering wheel end shaft 1 by the transmission mechanism. The transmission mechanism may be, for example, a conveyor belt. For example, a first roller may be mounted to the output shaft of the motor, and a second roller may be mounted to the steering wheel end shaft 1. The first roller and the second roller are connected with each other in a transmission way by the conveyor belts mounted to the first roller and the second roller.

In an optional embodiment, in order to reduce a size of the torque feedback mechanism to conveniently mount the torque feedback mechanism, the transmission mechanism includes a first gear 21 connected with the output shaft of the motor for synchronous rotation and a second gear 2 connected with the steering wheel end shaft 1 for synchronous rotation. The first gear 21 is meshed with the second gear 2. The first gear 21 may be coaxially fixed to the output shaft of the motor 23. The second gear 2 may be coaxially fixed to the steering wheel end shaft 1. The output shaft of the motor 23 is parallel to the steering wheel end shaft 1. The driving force outputted by the motor 23 may be transmitted to the steering wheel end shaft 1 by means of the first gear 21 and the second gear 2, thereby applying the feedback torque to the steering wheel end shaft 1.

Optionally, a diameter of the first gear 21 is less than a diameter of the second gear 2. By means of the transmission by the transmission mechanism, a speed can be reduced and a torque can be increased. That is to say, the transmission mechanism reduces a rotation speed output and increases a torque output. In this way, a relatively small motor 23 may be selected to feed back a relatively large torque. Therefore, an occupation space and a size of the torque feedback mechanism can be reduced.

In an optional embodiment, the second gear 2 is coaxially fixed to the steering wheel end shaft 1 in the following manner. Specifically, the second gear 2 is an annular gear ring. The annular ring gear is sleeved outside the steering wheel end shaft 1. A retaining structure that can respectively abut against two axial end surfaces of the second gear 2 is disposed on the outer sidewall of the steering wheel end shaft 1.

Referring to FIG. 5 to FIG. 6, more specifically, the retaining structure includes a retaining surface formed on the outer circumferential surface of the steering wheel end shaft 1. The retaining surface abuts against an upper end surface of the second gear 2, to avoid an axial upward displacement of the second gear 2 relative to the steering wheel end shaft 1. Further, the retaining structure further includes a retaining ring 3 coaxially mounted to the outer sidewall of the steering wheel end shaft 1. The retaining ring 3 abuts against a lower end surface of the second gear 2, to avoid an axial downward displacement of the second gear 2 relative to the steering wheel end shaft 1. In order to mount the retaining ring 3, a groove is formed on the outer sidewall of the steering wheel end shaft 1 along a circumferential direction. The retaining ring 3 is inserted and tightly fixed in the groove.

As described above, the second gear 2 is connected with the steering wheel end shaft 1 for synchronous rotation. In order to achieve the function, a protrusion is formed on the outer sidewall of the steering wheel end shaft 1, and a notch is formed on an edge portion of an inner rim of the second gear 2 corresponding to the protrusion. The protrusion is accommodated in the notch. In this way, the second gear 2 can be prevented from circumferentially displacing relative to the steering wheel end shaft 1.

After completion of the automobile game mode, the steering wheel end shaft 1 and the steering device end shaft are required to be coupled to cause the automobile to enter the normal driving mode. During coupling between the steering wheel end shaft 1 and the steering device end shaft by using the clutch mechanism, the steering wheel end shaft 1 and the steering device end shaft are required to be aligned to each other. For example, the clutch mechanism is splined with the steering wheel end shaft 1 and the steering, device end shaft. When protruding portions of internal splines of the sleeve 14 are opposite to recessed portions of external splines of the steering device end shaft, the movement of the sleeve 14 can realize the coupling between the steering wheel end shaft 1 and the steering device end shaft. Otherwise, the sleeve 14 cannot realize the coupling between the steering wheel end shaft 1 and the steering device end shaft.

However, after the steering wheel end shaft 1 and the steering device end shaft are decoupled, since the user operates the steering wheel to turn during a game, after completion of the game, the steering wheel may no longer be located at a steering angle before the decoupling. The deflection of the steering wheel causes the steering wheel end shaft 1 to deflect. When the steering wheel end shaft 1 and the steering device end shaft are no longer aligned to each other, the steering wheel end shaft 1 and the steering device end shaft cannot realize re-coupling after the game, which affects normal use of the automobile.

In order to resolve the technical problem, in some embodiments of the present disclosure, the steering system further includes a reset mechanism. The reset mechanism is configured to drive the steering wheel end shaft 1 to be reset after completion of the game mode, to enable the clutch mechanism to realize coupling between the steering wheel end shaft 1 and the steering device end shaft. The resetting of the steering wheel end shaft 1 means that the steering wheel end shaft 1 is reset to the steering angle before the decoupling, and before the decoupling of the steering wheel end shaft 1, the steering wheel end shaft 1 and the steering device end shaft are aligned to each other.

Specifically, the reset mechanism includes: an angle detection element, configured to detect a steering angle of the steering wheel end shaft 1 before completion of the game mode and a steering angle of the steering wheel end shaft 1 after completion of the game mode; a power element, configured to provide a driving force; a transmission mechanism, configured to transmit the driving force to the steering wheel end shaft 1 to drive the steering wheel end shaft 1 to be reset to the steering angle before the decoupling; and a controller, configured to control, according to the steering angle detected by the angle detection element, the power element to provide the driving force.

More specifically, the angle detection element may be an angle sensor. The angle sensor may be integrated with the torque sensor described above. That is to say, the torsional torque of the steering wheel end shaft 1 and the steering angle of the steering wheel end shaft 1 may be detected by using the torque-angle sensor. In this way, an overall size of the torque feedback mechanism is reduced, thereby facilitating mounting of the system. The torque-angle sensor may be mounted to the steering wheel end shaft 1, or may be integrated in the motor 23. The torsional torque and the steering angle of the steering wheel end shaft 1 are indirectly detected by detecting a torsional torque and a steering angle of the output shaft of the motor 23. The controller precisely controls an output rotation speed and a rotation quantity of the motor 23 to cause the steering wheel end shaft 1 to be reset to an initial angle before the decoupling after completion of the game.

The corresponding output rotation speed and rotation quantity of the motor 23 causing the steering wheel end shaft 1 to be reset to the initial angle before the decoupling may be obtained according to the steering angle detected by the angle detection element. When the controller controls the power element to provide the corresponding driving force, the driving force is calculated according to the output rotation speed and the rotation quantity of the motor 23.

A hardware structure of the reset mechanism may be same as a hardware structure of the torque feedback mechanism described above, except that magnitudes of the outputted driving forces are different. The driving force outputted by the torque feedback mechanism is generally relatively small, and is merely used for improving operation experience of a user. The driving force outputted by the reset mechanism is generally relatively large, and is intended to drive the steering wheel end shaft 1 to be turned and reset after completion of the game.

The power element in the reset mechanism or the torque feedback mechanism may be fixed to the clutch mechanism housing of the clutch mechanism.

Figure 3:
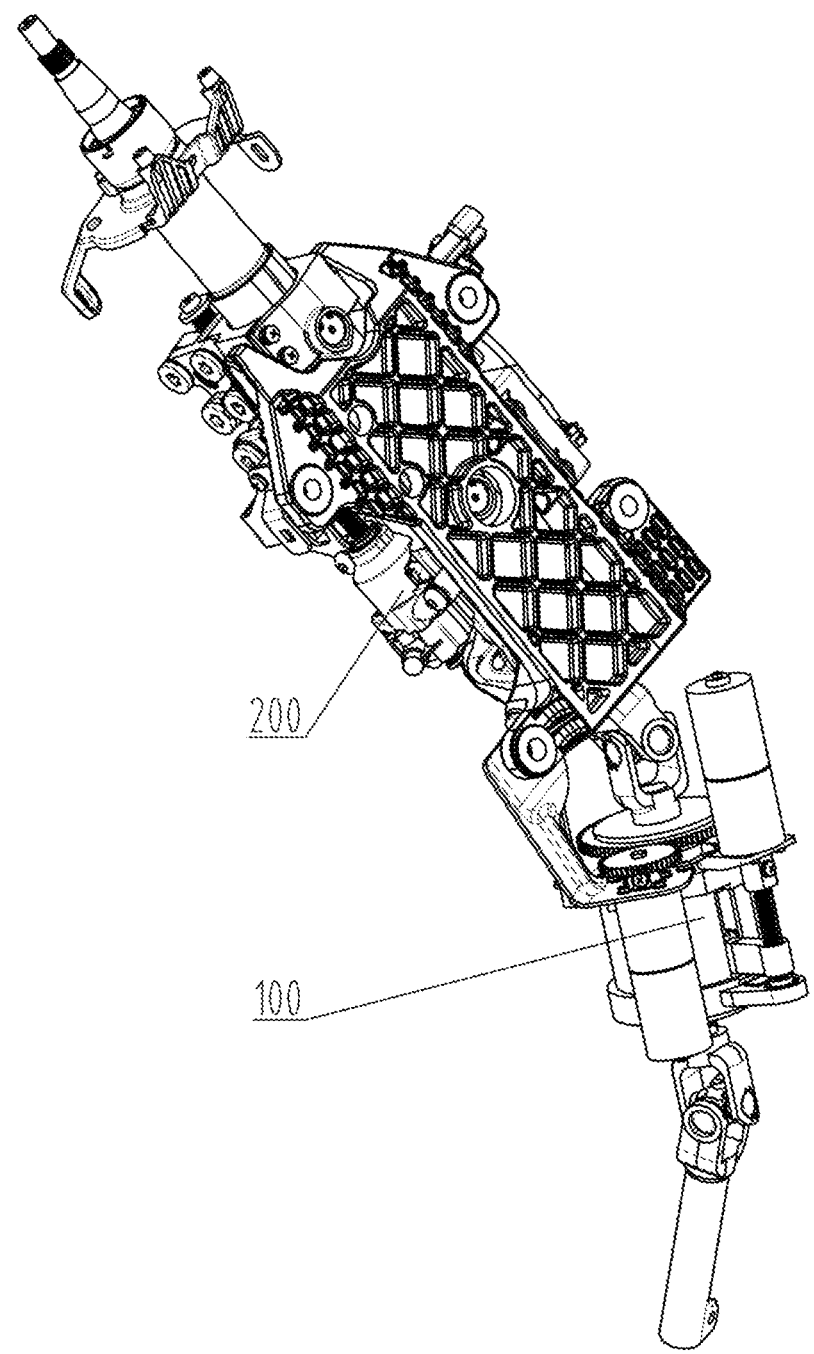
FIG. 3 is a schematic structural diagram of a steering system of an automobile having a clutch mechanism mounted thereto according to an embodiment of the present disclosure.

Referring to FIG. 3 to FIG. 4, in an optional embodiment of the present disclosure, the power element of the reset mechanism or the torque feedback mechanism may be fixed to the first mounting block of the clutch mechanism housing. Specifically, a mounting hole is formed on the first mounting block corresponding to the power element of the reset mechanism or the torque feedback mechanism. Generally, the power element is the motor 23. The power element housing of the motor 23 is mounted to the first mounting block by using the intermediate adapter bracket 22.

As shown in FIG. 4, the intermediate adapter bracket 22 is in a plate structure. A relatively large through hole is formed on the plate structure. The output shaft of the motor 23 extends through the through hole. Multiple small positioning holes are formed around the through hole. Multiple mounting holes are formed on an end portion of the power element housing of the motor 23 corresponding to the positioning holes. The power element housing of the motor 23 is fixed to the intermediate adapter bracket 22 by using connecting members such as screws extending through the positioning holes and the mounting holes. In addition, multiple small holes are further formed on the intermediate adapter bracket 22 corresponding to the mounting holes on the first mounting block. The intermediate adapter bracket 22 is fixed to the first mounting block by using connecting members such as bolts extending through the small holes and the mounting holes.

After the steering wheel end shaft 1 and the steering device end shaft are decoupled by using the clutch mechanism 100, the steering wheel cannot be turned in one direction infinitely, which, otherwise, does not correspond to an actual situation, resulting in poor driving experience. More importantly, a clock spring in the steering wheel may be broken, resulting in a failure of many electronic buttons on the steering wheel. Therefore, after the decoupling, limiting is usually required.

In order to realize the function, in some embodiments of the present disclosure, a limiting mechanism configured to limit a range of steering angle of the steering wheel end shaft 1 in the decoupled state is further disposed in the steering system.

Specifically, the steering wheel end shaft 1 is a hollow structure. A part of the steering device end shaft in an axial direction extends into the hollow structure. The limiting mechanism includes a limiting nut 6 threadedly connected with an end 56 of the steering device end shaft located in the hollow structure. External splines mated with splines on an inner circumferential surface of the hollow structure are formed on an outer circumferential surface of the limiting nut 6. Limiting portions configured to limit displacements on two axial sides of the limiting nut are disposed on the inner circumferential surface of the hollow structure and/or an outer circumferential surface of the steering device end shaft.

More specifically, for example, inner trapezoidal threads are machined on an inner circumferential surface of the limiting nut 6, and outer trapezoidal threads are machined on an outer circumferential surface of an upper end portion of the steering device end shaft. The inner trapezoidal threads are mated with the outer trapezoidal threads. Outer rectangular splines are machined on the outer circumferential surface of the limiting nut 6, and inner rectangular splines are correspondingly machined on an inner circumferential surface of the steering wheel end shaft 1. The outer rectangular splines are mated with the inner rectangular splines. The limiting portions configured to limit the displacements on the two axial sides of the limiting nut 6 may be, for example, limiting posts.

After the steering wheel end shaft 1 and the steering device end shaft are decoupled, that is, the automobile enters the game mode, when the steering wheel is turned to drive the steering wheel end shaft 1 to rotate, the limiting nut 6 converts the rotation to linear movement to translate up or down along an axial direction. A top dead center may depend on a corresponding structure of the steering wheel end shaft 1. A bottom dead center may depend on a corresponding structure of the steering device end shaft. Since the steering wheel end shaft 1 and the steering device end shaft are not axially moved, positions of the top dead center and the bottom dead center are accurate and reliable. Leads of the inner trapezoidal transmission threads are adjusted according to a stroke of the limiting nut 6, so as to precisely control an extreme rotation angle of the steering wheel. It may be understood that, the top dead center and the bottom dead center may alternatively be formed on either the steering wheel end shaft 1 or the steering device end shaft. Alternatively, the top dead center is formed on the steering device end shaft, and the bottom dead center is formed on the steering wheel end shaft 1. The top dead center and the bottom dead center herein are positions of the above limiting posts.

During actual mounting of the limiting nut 6, generally, the limiting nut 6 is first required to be positioned in the steering wheel end shaft 1, and then the steering device end shaft is inserted into and threadedly connected with the limiting nut 6. In order to facilitate the positioning of the limiting nut 6 during the mounting of the limiting nut 6, a through hole is formed on a sidewall of the nut 6. During the mounting, a shaft pin 7 is first caused to extend through the through hole to position the limiting nut 6 in the steering wheel end shaft 1, then the steering device end shaft is threadedly connected with the limiting nut 6, and then the shaft pin is removed.

Referring to FIG. 4 to FIG. 6, in an optional embodiment, in order to reduce mounting and manufacturing difficulty of the steering device end shaft, the steering device end shaft includes a steering sleeve 53 and a steering shaft 70 that are disposed coaxially. The steering shaft 70 extends into the steering sleeve 53 and is splined with the steering sleeve 53. The steering sleeve 53 is located on an inner side of the steering wheel end shaft 1. External splines that can be splined with the slidable block 14 are machined on an outer circumferential surface of a lower portion of the steering sleeve. Outer threads that can be threadedly connected with the limiting nut are machined on an outer circumferential surface of an upper end of the steering sleeve. Internal splines splined with the steering shaft are machined on an inner circumferential surface of the steering sleeve.

Further, in order to improve mounting stability of the steering device end shaft in the steering wheel end shaft 1, the upper end of the steering sleeve 53 is supported in the steering wheel end shaft 1 by using a sleeve bearing 52. Specifically, the inner circumferential surface of the steering wheel end shaft 1 is tightly mated with an outer rim of the sleeve bearing 52, and an inner rim of the sleeve bearing 52 is tightly mated with an outer circumferential surface of the steering sleeve 53. In this way, the steering device end shaft can be stably mounted in the steering wheel end shaft 1.

Optionally, in order to improve mounting stability of the sleeve bearing 52 on the steering sleeve 53, a limiting structure that can respectively abut against upper and lower end surfaces of the inner rim of the sleeve bearing 52 is formed on the outer circumferential surface of the steering sleeve 53. The limiting structure includes a limiting surface that is formed on the outer circumferential surface of the steering sleeve 53 and can abut against the lower end surface of the bearing and a limiting ring 51 mounted to the outer circumferential surface of the steering sleeve 53. The limiting ring 51 abuts against the upper end surface of the sleeve bearing 52.

In order to mount the limiting ring 51, a groove configured to mount the limiting ring 51 may be machined on the outer circumferential surface of the steering sleeve 53.

Figure 7:
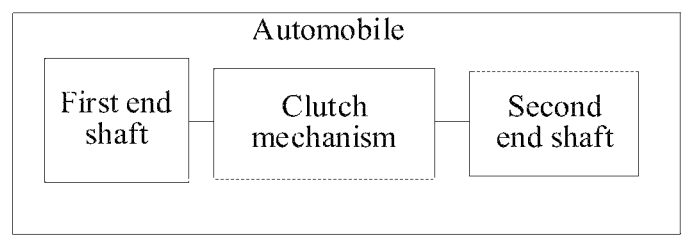
FIG. 7 is a block diagram of an automobile according to an embodiment of the present disclosure.

Referring to FIG. 7, based on the steering system provided in the second aspect of the embodiments of the present disclosure, a third aspect of the embodiments of the present disclosure provides an automobile. The automobile includes the steering system in the second aspect of the embodiments of the present disclosure.

The optional implementations of the present disclosure are described in detail above with reference to the accompanying drawings, but the present disclosure is not limited thereto. Various simple modifications may be made to the technical solutions of the present disclosure within the scope of the technical concept of the present disclosure, including any proper combination of the specific technical features. In order to avoid unnecessary repetition, various possible combinations are not further described in the present disclosure. However, these simple modifications and combinations should also be regarded as content disclosed in the present disclosure, and all fall within the protection scope of the present disclosure.

What is claimed is:

1. A clutch mechanism, comprising:
a slidable block disposed in a radial spacing between a first end shaft and a second end shaft that are coaxially arranged, radially spaced apart from each other, and configured to translate along an axial direction of the first end shaft and the second end shaft to realize decoupling or coupling between the first end shaft and the second end shaft; and
a driving component, configured to drive the slidable block to translate along the axial direction of the first end shaft and the second end shaft;
wherein one of the first end shaft and the second end shaft comprises a hollow structure;
wherein a part of the other of the first end shaft and the second end shaft extends in the axial direction into the hollow structure;
wherein an outer circumferential surface of the part being radially spaced apart from an inner circumferential surface of the hollow structure to accommodate the slidable block;
wherein the part has a first axial section and a section axial section;
wherein a radial spacing between an outer circumferential surface of the first axial section and the inner circumferential surface of the hollow structure is less than a radial spacing between an outer circumferential surface of the second axial section and the inner circumferential surface of the hollow structure; and
wherein at a coupling position, an outer sidewall of the slidable block is engaged with the inner circumferential surface of the hollow structure and an inner sidewall of the slidable block is engaged with the outer circumferential surface of the first axial section.

2. The clutch mechanism according to claim 1, wherein the slidable block is splined with the hollow structure and the first axial section at the coupling position; and
wherein the slidable block is a sleeve arranged coaxially with the first end shaft and the second end shaft.

3. The clutch mechanism according to claim 1, wherein the driving component is located on an outer side of the hollow structure; and an opening is formed on a sidewall of the hollow structure to permit the driving component to connect with the slidable block; and
wherein a bearing is coaxially disposed on an outer side of the hollow structure, the slidable block being fixedly connected with an inner rim of the bearing and an outer rim of the bearing being connected with the driving component.

4. The clutch mechanism according to claim 3, further comprising a mounting member extending from the outer sidewall of the slidable block through the opening of the hollow structure and connected with the driving component and a limiting structure abutting two end surfaces of the inner rim of the bearing.

5. The clutch mechanism according to claim 3, wherein the bearing is mounted in a bearing mounting ring and a connecting portion formed on an outer circumferential surface of the bearing mounting ring is connected with the driving component, a radial step formed on an inner circumferential surface of the bearing mounting ring along a circumferential direction abuts a lower end surface of the outer rim of the bearing.

6. The clutch mechanism according to claim 1, wherein the driving component is an electric driving component comprising:
a power element configured to provide a driving force;
a screw rod connected with an output shaft of the power element for synchronous rotation; and
a helical transmission mechanism threadedly connected with the screw rod, connected with the slidable block, and configured to convert rotation of the screw rod to axial translation of the slidable block.

7. The clutch mechanism according to claim 6, further comprising a clutch mechanism housing and an adapter disposed on the clutch mechanism housing, wherein the hollow structure is axially rotatably mounted in the clutch mechanism housing, the driving component is mounted to an outer side of the clutch mechanism housing, and the adapter is configured to fix the clutch mechanism housing to a vehicle body.

8. The clutch mechanism according to claim 7, further comprising:
a plurality of arcuate plates formed on a lower portion of the hollow structure and spaced apart from each other along a circumferential direction;
a base having arcuate holes corresponding to structures of the arcuate plates;
a first bearing coaxially mounted in a radial spacing between the base and the clutch mechanism housing; and
a second bearing coaxially mounted in a radial spacing between an upper portion of the hollow structure and the clutch mechanism housing;
wherein the part of the other of first end shaft and the second end shaft extending in the axial direction extends into a circular space defined by the plurality of arcuate plates and bottom ends of the plurality of arcuate plates are inserted into the base through the arcuate holes and are fixed to the base.

9. The clutch mechanism according to claim 7, wherein the clutch mechanism housing has connecting portions protruding radially outwardly from opposite sides of the clutch mechanism housing, the screw rod being axially rotatably mounted to one of the connecting portions on one side of the clutch mechanism housing; and further comprising a power element housing of the power element mounted to one of the connecting portions on the other side of the clutch mechanism housing.

10. A steering system, comprising a first end shaft, a second end shaft, and a clutch mechanism configured to realize decoupling or coupling between the first end shaft and the second end shaft, wherein the first end shaft is a steering wheel end shaft, and the second end shaft is a steering device end shaft, and wherein the clutch mechanism is the clutch mechanism according to claim 1.

11. The steering system according to claim 10, further comprising a torque feedback mechanism, wherein the torque feedback mechanism is configured to apply a reverse feedback torque to the first end shaft according to a torsional torque of the first end shaft in a decoupled state.

12. The steering system according to claim 11, wherein the torque feedback mechanism comprises:
a torque detection element configured to detect the torsional torque of the first end shaft in the decoupled state;
a power element configured to provide a driving force;
a transmission element configured to transmit the driving force to the first end shaft to apply the reverse feedback torque to the first end shaft; and a controller configured to control, according to the torsional torque detected by the torque detection element, the power element to provide the driving force.

13. The steering system according to claim 12, wherein the power element is a motor and the transmission mechanism comprises a first gear connected with an output shaft of the motor for synchronous rotation and a second gear connected with the first end shaft for synchronous rotation, the first gear being meshed with the second gear;

wherein an external diameter of the first gear is less than an external diameter of the second gear; and wherein the second gear is coaxially fixed to the first end shaft via a retaining structure disposed on an outer sidewall of the first end shaft, the retaining structure respectively abutting two axial end surfaces of the second gear; and wherein a protrusion formed on the outer sidewall of the first end shaft is accommodate in a notch formed on an edge portion of an inner rim of the second gear.

14. The steering system according to claim 10, further comprising a reset mechanism, wherein the reset mechanism is configured to drive the first end shaft to a starting position after decoupling such that the clutch mechanism may recouple the first end shaft and the second end shaft.

15. The steering system according to claim 14, wherein the reset mechanism comprises:

an angle detection element configured to detect a steering angle of the first end shaft before the decoupling and a steering angle of the first end shaft after completion of the decoupling;

a power element configured to provide a driving force;

a transmission mechanism configured to transmit the driving force to the first end shaft to drive the first end shaft to be reset to the steering angle before the decoupling; and a controller configured to control the power element to provide the power element to provide the driving force according to the steering angle detected by the angle.

16. The steering system according to claim 10, further comprising a limiting mechanism configured to limit a range of steering angle of the first end shaft in a decoupled state.

17. The steering system according to claim 16, wherein the first end shaft is a hollow structure, a part of the second end shaft extends in an axial direction into the hollow structure, and the limiting mechanism comprises a limiting nut threadedly connected with an end of the second end shaft located in the hollow structure;

wherein the limiting nut has external splines on an outer circumferential surface operable to mate with splines on an inner circumferential surface of the hollow structure; and wherein at least one of an inner circumferential surface of the hollow structure and an outer circumferential surface of the second end shaft has a limiting portion configured to limit displacement of the limiting nut; and wherein the second end shaft comprises a steering sleeve and a steering shaft that are disposed coaxially, the steering sleeve being disposed in the hollow structure and the steering shaft extending into the steering sleeve and being connected with the steering sleeve for synchronous rotation.

18. An automobile, comprising the steering system according to claim 10.

* * * * *